(12) United States Patent
Thomas et al.

(10) Patent No.: US 7,871,704 B2
(45) Date of Patent: Jan. 18, 2011

(54) MULTI-CURE COMPOSITIONS COMPRISING POLYTHIOL

(75) Inventors: Stephen J. Thomas, Aspinwall, PA (US); Mark P. Bowman, New Kensington, PA (US); Vittorio Montanari, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 148 days.

(21) Appl. No.: 12/202,874

(22) Filed: Sep. 2, 2008

(65) Prior Publication Data

US 2010/0056722 A1   Mar. 4, 2010

(51) Int. Cl.
*B32B 27/00* (2006.01)
*B32B 27/36* (2006.01)
*C08G 18/00* (2006.01)

(52) U.S. Cl. .................. 428/411.1; 428/419; 428/423.1; 522/93; 522/107; 522/173; 522/179; 528/65; 528/66

(58) Field of Classification Search ............ 522/93, 522/96, 104, 107, 116, 117, 121, 173, 179; 528/65, 66; 428/411.1, 41, 423.1–425.99
See application file for complete search history.

(56) References Cited

U.S. PATENT DOCUMENTS

| | | | |
|---|---|---|---|
| 3,355,512 A | 11/1967 | De Acetis | |
| 3,653,959 A * | 4/1972 | Kehr et al. ................... | 361/600 |
| 3,976,553 A | 8/1976 | Larsen | |
| 4,008,341 A | 2/1977 | Kehr | |
| 4,031,271 A | 6/1977 | Bush | |
| 4,139,385 A | 2/1979 | Crivello | |
| 4,234,676 A | 11/1980 | Hein | |
| 4,584,363 A * | 4/1986 | Goel et al. ..................... | 528/73 |
| 4,808,638 A | 2/1989 | Steinkraus | |
| 5,095,069 A | 3/1992 | Ambrose | |
| 5,876,805 A | 3/1999 | Ostlie | |
| 6,172,179 B1 | 1/2001 | Zook | |
| 6,423,816 B1 | 7/2002 | Wamprecht et al. | |
| 6,551,710 B1 | 4/2003 | Chen | |
| 6,639,046 B1 | 10/2003 | Van Dijk | |
| 6,716,891 B1 * | 4/2004 | Meisenburg et al. .......... | 522/90 |
| 6,852,765 B2 * | 2/2005 | Decker et al. ................. | 522/2 |
| 2003/0134929 A1 * | 7/2003 | Blum et al. ................. | 522/116 |
| 2005/0027082 A1 | 2/2005 | Narayan-Sarathy | |
| 2007/0142603 A1 | 6/2007 | Rukavina | |

FOREIGN PATENT DOCUMENTS

| | | |
|---|---|---|
| EP | 0720996 B1 | 7/1996 |
| GB | 2078766 A | 2/1982 |
| WO | 00/37524 | 6/2000 |
| WO | WO 00/71605 A1 | 11/2000 |

OTHER PUBLICATIONS

Sanui et al., "The Catalytic Effect of Alcohol and Mercaptan on the Michael Reaction of Acrylates", Bulletin of the Chemical Society of Japan, vol. 40, 1727 (1967).

* cited by examiner

*Primary Examiner*—Susan W Berman
(74) *Attorney, Agent, or Firm*—Diane R. Meyers; Alka A. Patel

(57) ABSTRACT

A composition comprising an unsaturated polyester polyol oligomer and an isocyanate are disclosed; the composition can further comprise a radiation-curable compound, such as a (meth)acrylic copolymer, and/or a polythiol. Methods for using the composition and substrates treated therewith are also disclosed.

19 Claims, No Drawings

US 7,871,704 B2

MULTI-CURE COMPOSITIONS COMPRISING POLYTHIOL

FIELD OF THE INVENTION

The present invention is directed to compositions that comprise an unsaturated polyester polyol oligomer and isocyanate.

BACKGROUND OF THE INVENTION

Radiation curing of automotive refinish compositions is becoming of increasing interest for use in body fillers, primers, surfacers and topcoats. The advantages of radiation curing are that it is quick, can be conducted at ambient temperature, and radiation-curable compositions can be formulated at high solids content, which is environmentally desirable. However, a problem in coating automobile bodies with radiation-curable compositions lies in the curing of areas not directly accessible to radiation such as shadow zones, for example, cavities, folds and other undercuts resulting from the automotive manufacturing process. Also, pigmented coating compositions may contain pigments that absorb radiation, such as carbon black and titanium dioxide, resulting in insufficient radiation to cure the resinous film-forming binder. Finally, ultraviolet radiation in the 200-400 nanometer wavelength range, although effective for curing thin coatings, is not particularly effective in curing the interior regions of thick coatings.

Therefore, it is desirable to have a composition that cures well when exposed to radiation and also cures via an alternate curing mechanism when radiation is insufficient to bring about complete cure.

SUMMARY OF THE INVENTION

The present invention is directed to a composition comprising:
a) an unsaturated polyester polyol oligomer; and
b) isocyanate.
The present invention is further directed to a composition comprising:
a) a first component comprising:
i) the reaction product of a polyacid/anhydride and a polyol; and
ii) a radiation-curable compound;
b) a second component comprising isocyanate; and
c) a third component comprising polythiol.

DETAILED DESCRIPTION OF THE INVENTION

The present invention is directed to a composition comprising: a) an unsaturated polyester polyol oligomer; and b) isocyanate. The composition is sometimes referred to herein as a "multi-cure coating", because it is believed to undergo cure through two or more different mechanisms. Certain embodiments of the invention utilize biomass derived products. As used herein, the term "biomass derived" will be understood to be derived from a living or recently living organism, for example, plants (including trees) or animals and not from a petroleum-based source. "Composition" as used herein refers to any composition, such as a coating, adhesive, putty, and the like.

Any suitable unsaturated polyester polyol oligomer can be used according to the present invention. A suitable unsaturated polyester polyol oligomer can be prepared, for example, by reacting a polyol and a polycarboxylic acid/anhydride, wherein the polyol and/or the polycarboxylic acid/anhydride comprise unsaturation. This reaction product is sometimes referred to herein as the "polyol/polycarboxylic reaction product" and like terms.

Any suitable polyol can be used to prepare the polyol/polycarboxylic reaction product. A polyol will be understood by those skilled in the art as a compound having two or more hydroxy groups. In addition to the polyols listed above, suitable polyols can include, but are not limited to, small molecules containing more than one hydroxyl group, for example neopentyl glycol, glycerol, pentraerythritol, isosorbide and/or propanediol, or polymeric polyols such as a polyester polyol or an acrylic polyol. Suitable polyols are widely commercially available. Particularly suitable polyols have an Mn of 500 to 100,000, such as 500 to 10,000. In certain embodiments, the polyols can have hydroxyl values of 20 to 400, such as 40 to 300; in other embodiments, the hydroxyl value can range from 1200 to 2100, such as 1400 to 1900.

In certain embodiments, at least some of the polyol is biomass derived. These polyols can be derived from natural oils such as castor oil, peanut oil, soy bean oil or canola oil. The hydroxyl groups present in the biomass derived polyols can be naturally occurring or they can be introduced, for example, by modification of carbon-carbon double bonds present in the oils. Natural oil derived polyols are described in United States Patent Application Publication Number 2006/0041156 A1, U.S. Pat. No. 7,084,230, WO 2004/096882 A1, U.S. Pat. Nos. 6,686,435, 6,107,433, 6,573,354 and 6,433,121, all of which are incorporated in their entirety herein. Methods of modifying carbon-carbon double bonds to introduce hydroxyl groups include treatment with ozone, air oxidation, reaction with peroxides or hydroformylation (as described in "Polyols and Polyurethanes from Hydroformylation of Soybean Oil", Journal of Polymers and the Environment, Volume 10, Numbers 1-2, pages 49-52, April, 2002, incorporated herein in its entirety). A particularly suitable biomass derived polyol is a soy polyol. Soy polyols are commercially available from Cargill Inc., Urethane Soy Systems Co. and BioBased Technologies. In certain embodiments, the ethylenic unsaturation in the reaction product can be derived from the polyol; that is, the polyol has ethylenic unsaturation that does not react in the formation of the polyol/polycarboxylic reaction product. In certain embodiments, combinations of polyols can be used.

Any suitable polycarboxylic acid/anhydride can be used according to the present invention. It will be understood by those skilled in the art that a polycarboxylic acid is one that has two or more acid functional groups, or residues thereof, such as anhydride groups. Suitable polycarboxylic acid/anhydrides include maleic acid/anhydride, fumaric acid/anhydride, and itaconic acid/anhydride. In certain embodiments, the polycarboxylic acid/anhydride is a biomass derived polycarboxylic acid/anhydride. A suitable example includes itaconic acid/anhydride, which is commercially available from Cargill, Aldrich, Acros and the like. Thus, the ethylenic unsaturation in the reaction product can be derived from the polycarboxylic acid/anhydride.

In certain embodiments, the polyol/polycarboxylic reaction product is further reacted with a hydroxyl-carboxylic acid. Any suitable hydroxyl-carboxylic acid can be used according to the present invention. It will be understood by those skilled in the art that a hydroxyl-carboxylic acid is one that has one or more acid functional groups and one or more hydroxyl groups, and is sometimes called a hydroxy acid. A suitable example includes 12-hydroxystearic acid, which is commercially available from Arizona Chemical Co.

The compositions of the present invention further comprise an isocyanate. Suitable polyisocyanates are well known in the art and widely available commercially. For example, suitable polyisocyanates are disclosed in U.S. Pat. No. 6,316,119 at columns 6, lines 19-36, incorporated by reference herein in relevant part. Examples of commercially available polyisocyanates include DESMODUR N3390, which is sold by Bayer Corporation and TOLONATE HDT90, which is sold by Rhodia Inc. Suitable polyisocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates, and polycarbodiimides such as those disclosed in U.S. patent application Ser. No. 12/056,304 filed Mar. 27, 2008, incorporated by reference in its entirety herein. Suitable polyisocyanates are well known in the art and widely available commercially.

It will be appreciated by those skilled in the art that the unsaturated polyester polyol oligomer renders the coating "multi-cure". The coating will undergo radiation cure via the unsaturation in the oligomer and will also undergo cure upon reaction of the hydroxy groups with the isocyanate.

The present compositions may further comprise one or more additional components that contribute to the cure and/or film formation of the composition. For example, the compositions can also comprise a radiation-curable compound. A "radiation-curable compound" as used herein will be understood as referring to any compound that, when exposed to radiation, will undergo crosslinking with itself and/or another radiation-curable compound. Typically, such compounds comprise a "radiation-curable moiety" through which radiation cure occurs. Such moieties may, for example, comprise $C=CH_2$ functionality. These compounds may further comprise a second functionality such as hydroxy, thiol, primary amines and/or secondary amines.

In certain embodiments, the radiation-curable compound comprises a (meth)acrylic polymer or copolymer. As used herein, "(meth)acrylic" and like terms refers both to the acrylic and the corresponding methacrylic. Suitable (meth)acrylic polymers include (meth)acrylic functional (meth)acrylic copolymers, epoxy resin(meth)acrylates, polyester (meth)acrylates, polyether(meth)acrylates, polyurethane (meth)acrylates, amino(meth)acrylates, silicone(meth)acrylates, and melamine(meth)acrylates. The number average molecular weight ("Mn") of these compounds can range from 200 to 10,000, such as 1200 to 3000. These compounds can contain any number of olefinic double bonds that allow the compound to be polymerized upon exposure to radiation; in certain embodiments, the compounds have an olefinic equivalent weight of 500 to 2000. The (meth)acrylic polymers can be (cyclo)aliphatic and/or aromatic.

In certain embodiments, the (meth)acrylic copolymer comprises a urethane linkage, and in certain other embodiments can comprise a urethane linkage, a terminal acrylate group, and a hydroxy group. Specific examples of polyurethane(meth)acrylates are reaction products of a polyisocyanate such as 1,6-hexamethylene diisocyanate and/or isophorone diisocyanate, including isocyanurate and biuret derivatives thereof, with hydroxyalkyl(meth)acrylate such as hydroxyethyl(meth)acrylate and/or hydroxypropyl(meth)acrylate. The polyisocyanate can be reacted with the hydroxyalkyl(meth)acrylate in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane. Examples of polyester(meth)acrylates are the reaction products of a (meth)acrylic acid or anhydride with a polyol, such as diols, triols and tetraols, including alkylated polyols, such as propoxylated diols and triols. Examples of polyols include 1,4-butane diol, 1,6-hexane diol, neopentyl glycol, trimethylol propane, isosorbide, pentaerythritol and propoxylated 1,6-hexane diol. Specific examples of suitable polyester(meth)acrylates are glycerol tri(meth)acrylate, trimethylolpropane tri(meth)acrylate, pentaerythritol tri(meth) acrylate and pentaerythritol tetra(meth)acrylate.

It will be appreciated that the radiation-curable compound used in certain embodiments in addition to the unsaturated polyester polyol oligomer will aid in cure and/or film formation of the composition via the radiation-curable moiety of the compound. In certain embodiments, in which functionality that is reactive with isocyanate is also present on the radiation-curable compound, such functionality will react with the isocyanate in yet another cure mechanism.

In addition, the present compositions may further comprise a polythiol. Any suitable polythiol can be used in the coatings of the present invention. A "polythiol" or "polythiol functional material" refers to polyfunctional materials containing two or more thiol functional groups (SH). The polythiol can further comprise ether linkages (—O—), sulfide linkages (—S—), including polysulfide linkages (—$S_x$—), wherein $x$ is at least 2, such as from 2 to 4, and combinations of such linkages. The polythiols for use in the present invention include, but are not limited to, materials of the formula:

wherein $R_1$ is a polyvalent organic moiety and n is an integer of at least 1, such as 2 to 6.

Non-limiting examples of suitable polythiols include, but are not limited to, esters of thiol-containing acids of the formula $HS—R_2—COOH$ wherein $R_2$ is an organic moiety with polyhydroxy compounds of the structure $R_3—(OH)_n$ wherein $R_3$ is an organic moiety and n is an integer of at least 2, typically 2 to 6. These components can be reacted under suitable conditions to give polythiols having the general structure:

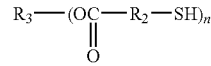

wherein $R_2$, $R_3$ and n are as defined above.

Examples of thiol-containing acids are thioglycolic acid ($HS—CH_2COOH$), α-mercaptopropionic acid ($HS—CH(CH_3)—COOH$) and β-mercaptopropionic acid ($HS—CH_2CH_2COCH$) with polyhydroxy compounds such as glycols, triols, tetraols, pentaols, hexaols, and mixtures thereof. Other non-limiting examples of suitable polythiols include, but are not limited to, ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis(β-mercaptopropionate), and mixtures thereof.

It will be appreciated that, when used, the polythiol may also contribute to the cure and/or film formation of the composition. The thiol group and the unsaturation of the unsaturated polyester polyol oligomer, and the radiation-curable moiety of the radiation-curable compound, if used, may undergo a Michael addition reaction. A Michael addition reaction will be understood by those skilled in the art as the addition of a thiol to a Michael acceptor. The mechanism can involve anionic or radical intermediates. Cure via the Michael addition reaction is particularly beneficial to address the issue of "shadow cure". Shadow cure occurs in areas on a substrate wherein sufficient radiation cure does not occur, such as on curved or bent substrates where the coating cannot be contacted with sufficient radiation energy to effect complete cure.

According to certain embodiments of the present invention, the composition is a multi-component composition. A multi-component composition will be understood as a coating in which various components are maintained separately until just prior to application. Here, for example, the composition can be two-component ("2K") or a three-component ("3 K") coating in which the first component comprises the unsaturated polyester polyol oligomer and, if used, any other radiation-curable compound, and the second component comprises isocyanate; a third component in certain embodiments comprises polythiol. Each of these components can further comprise one or more additional additives known in the art of formulating compositions as disclosed herein, such as coatings, adhesives and putties, such as colorants, plasticizers, anti-oxidants, hindered amine light stabilizers, UV light absorbers and stabilizers, surfactants, flow control agents, thixotropic agents, fillers, organic cosolvents, abrasion resistant particles, reactive diluents, catalysts, grind vehicles, free radical inhibitors, and other customary auxiliaries.

An "abrasion resistant particle" is one that, when used in a composition, will impart some level of abrasion resistance to the coating as compared with the same composition lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used in the coatings of the present invention. In certain embodiments, the compositions contain one or more transparent pigments, such as colloidal silica, and colorants that are soluble in the coating composition such as dyes. These ingredients, if used, can be present in the composition in amounts of up to 20, such as up to 10 percent by weight based on weight of the topcoat composition. If the composition is a coating that is a clear coat, that is, a coating that is substantially clear, the colorant used does not impart significant opacity to the coating. It will be understood that certain colorants will impart color and/or other visual effect to a clear coat and the clear coat will still be substantially clear.

As noted above, the compositions of the present invention are believed to undergo multiple cure mechanisms; that is, the "multi-cure" coatings cure by two or more different means. In a first cure mechanism, the isocyanate reacts with the active hydrogen-containing compounds. This can include the hydroxy on the unsaturated polyester polyol oligomer, the active hydrogen, if any, on the radiation-curable compounds, if used, and the active hydrogen on the polythiol compound, if used. Accordingly, in certain embodiments of the invention, one or more of the composition components, such as the first component, may comprise a catalyst for the reaction between the isocyanate and the active hydrogen-containing compounds. Suitable catalysts include tin (IV) compounds, such as dibutyltin dilaurate, tertiary amines such as DABCO, amine salts such as the triethylamine salt of dibutyl phosphate, acids such as phenyl acid phosphate and acetic acid, and metal chelates such as zirconium acetylacetonate, all of which are known to those skilled in the art to catalyze the reaction of isocyanates with active hydrogens Another cure mechanism that occurs within the composition of the present invention is the reaction between the olefinic double bonds on the unsaturated polyester polyol oligomer with themselves and, if a radiation-curable compound is used, the radiation curable moieties therein. Accordingly, in certain embodiments, one or more of the components, such as the first component, of the composition may further comprise a free radical initiator. Suitable free radical initiators include IRGACURE 184 and IRGACURE 819, both products of Ciba Speciality Chemicals.

Another cure mechanism that may occur is the Michael addition reaction as discussed above, wherein the thiol function reacts with a Michael acceptor, such as the olefinic double bonds on the unsaturated polyester polyol oligomer and, if used, the radiation-curable compound. Accordingly, one or more of the composition components may further comprise a catalyst for the Michael addition reaction. Suitable catalysts include primary, secondary or tertiary amines, strong bases such as sodium ethoxide, weaker bases such as potassium acetate, free radical initiators including UV photoinitiators discussed above and acids such as para-toluenesulfonic acid.

One or more of the components of the present composition can further comprise a solvent and/or reactive diluent. Suitable solvents include water, mono- or polyhydric alcohols, for example, ethylene glycol and butanol, and glycol ethers or esters, for example, diethylene glycol dialkyl ethers containing a $C_1$ to $C_6$ alkyl, butyl acetate, acetone, methyl propyleneglycol acetate, amyl propionate, methyl isobutyl ketone, ethyl acetate, and methyl amyl ketone. Suitable reactive diluents include reactive diluents that may be crosslinked with actinic radiation include, for example, (meth)acrylic acids and esters thereof, maleic acid and its esters, including monoesters, vinyl acetate, vinyl ethers, vinylureas, and the like. Further examples that may be mentioned include alkylene glycol di(meth)acrylate, polyethylene glycol di(meth)acrylate, 1,3-butanediol di(meth)acrylate, vinyl(meth)acrylate, allyl(meth)-acrylate, glycerol tri(meth)acrylate, trimethylol-propane tri(meth)acrylate, trimethylolpropane di(meth)-acrylate, styrene, vinyl toluene, divinylbenzene, pentaerythritol, tri(meth)acrylate, pentaerythritol tetra(meth)acrylate, dipentaerythritol penta(meth)acrylate, propylene glycol di(meth)acrylate, hexanediol di(meth)acrylate, ethoxyethoxyethyl acrylate, N-vinylpyrrolidone, phenoxyethyl acrylate, dimethylaminoethyl acrylate, hydroxyethyl (meth)acrylate, butoxyethyl acrylate, isobornyl(meth)acrylate, dimethylacrylamide, dicyclopentyl acrylate, the long-chain linear diacrylates described in EP 0 250 631 A1 with a molecular weight of from 400 to 4000, such as 600 to 2500. For example, the two acrylate groups may be separated by a polyoxybutylene structure. It is also possible to use 1,12-dodecyl propanediol and the reaction product of 2 moles of acrylic acid with one mole of a dimer fatty alcohol having generally 36 carbon atoms. Mixtures of the above monomers are also suitable. Further examples of suitable reactive diluents curable with actinic radiation are those described in Rompp Lexikon Lacke und Druckfarben, Georg Thieme Verlag, Stuttgart, New York, 1998, on page 491 under the entry on "Reactive diluents", incorporated herein by reference in its entirety. The solvents and/or diluents can comprise up to 50 percent by weight of the composition, based on weight of the composition.

The compositions of the present invention can comprise, for example, 0 to 50, such as 5 to 35 or 15 to 25 weight % unsaturated polyester polyol oligomer, and 10 to 50, such as 10 to 40 or 25 to 35 weight % isocyanate. When used, the composition can comprise 10 to 70, such as 15 to 55 or 35 to 45 radiation-curable compound and/or 0 to 10, such as 2 to 8 or 4 to 6 weight % polythiol, with all of the weight percents based on total solids weight of the composition. Additional components, if used, can comprise up to 15 weight %, such as up to 10 weight % or up to 7 weight %, with weight percent based on the total solids weight of the composition.

The present compositions can be applied to any substrates known in the art, for example, metallic or non-metallic substrates including polymeric, plastic, polycarbonate, polycarbonate/acrylobutadiene styrene ("PC/ABS"), polyamide, wood, veneer, wood composite, particle board, medium density fiberboard, cement, stone, biodegradable plastics such as cellulose, poly(lactic acid), poly(3-hydroxybutyrate) and starch based plastics, and the like. The substrate can also be one that has already been treated in some manner to impart color or other visual effect. For example, a wood substrate that has been stained may then be coated according to the present invention, as can a substrate that has already had one or more other coating layers applied to it.

As used herein, the term "polyamide" in reference to a substrate means a substrate constructed from a polymer that includes repeating units of the formula:

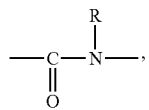

wherein R is hydrogen or an alkyl group. The polyamide may be any of a large class of polyamides based on aliphatic, cycloaliphatic, or aromatic groups in the chain. They may be formally represented by the products of condensation of a dibasic amine with a diacid and/or diacid chloride, by the product of self-condensation of an amino acid, such as omega-aminoundecanoic acid, or by the product of a ring-opening reaction of a cyclic lactam, such as caprolactam, lauryllactam, or pyrrolidone. They may contain one or more alkylene, arylene, or aralkylene repeating units. The polyamide may be crystalline or amorphous. In certain embodiments, the polyamide substrate comprises a crystalline polyamide of alkylene repeating units having from 4 to 12 carbon atoms, such as poly(caprolactam) (nylon 6), poly(lauryllactam) (nylon 12), poly(omega-aminoundecanoic acid) (nylon 11), poly(hexamethylene adipamide) (nylon 6.6), poly(hexamethylene sebacamide) (nylon 6.10), and/or an alkylene/arylene copolyamide, such as that made from meta-xylylene diamine and adipic acid (nylon MXD6). The term "nylon" includes all of these products as well as any other compound referred to in the art as nylon. Amorphous polyamides, such as those derived from isophoronediamine or trimethylcyclohexanediamine, may also be utilized. Blends of polyamides may also be utilized.

As used herein, the term "polyamide", when used in reference to a substrate, includes a reinforced polyamide substrate; a reinforced polyamide substrate is a polyamide substrate constructed from a polyamide that has been reinforced through the inclusion of, for example, fibrous materials, such as glass fiber or carbon fiber, or inorganic fillers, such as calcium carbonate, to produce a polyamide having increased rigidity, strength, and/or heat resistance relative to a similar polyamide that does not include such reinforcing materials. Reinforced polyamides, which are suitable for use as a substrate material in accordance with certain embodiments of the present invention, are commercially available and include, for example, those materials commercially available from Solvay Advanced Polymers under the IXEF name and, include, for example, the IXEF 1000, 1500, 1600, 2000, 2500, 3000 and 5000 series products; from EMS-Chemie Inc., Sumter, S.C., under the GRILAMID, GRIVORY, GRILON and GRILFLEX tradenames; and DuPont Engineered Polymers, such as those sold under the THERMX and MINLON tradenames.

The compositions according to the present invention can be applied by conventional methods, including spraying, brushing, roller painting or dipping, which may be particularly relevant if the composition is a coating or relatively non-viscous adhesive, or by spray gun, squeezie or other suitable applicator, which may be particularly relevant if the composition is a putty or viscous adhesive. A particular suitable application means when the composition is a coating is an external mixing apparatus, wherein two or more components are sprayed via a spray nozzle. In a non-limiting embodiment, a commercially available mixing device available commercially under the designation GUSMER VR-H-3000 proportioner fitted with a GUSMER Model GX-7 spray gun may be used. In this device, pressurized streams of the A- and B-side components are delivered from two separate chambers and are impacted or impinged upon each other at high velocity to mix the two components and form a coating composition, which may be applied to an uncoated or coated substrate using the spray gun. Other suitable devices are commercially available from DeVilbiss, such as the DEVILBISS HPLV spray gun.

After application of composition of the present invention, cure can be effected by exposure to high energy or actinic radiation. A class of high energy bombardment includes energetic electrons such as those derived from isotopes such as strontium-90, or intense electron beams produced by particle accelerators. Electron beam curing can be most useful in applications where very rapid and economical rates are desired. In some systems, curing periods of less than about one second may be used, which is a total radiation dose of less than about 0.25 megarads.

A class of actinic radiation useful according to the present invention is ultraviolet light; also suitable are other forms of actinic radiation that are normally found in radiation emitted from the sun or from artificial sources such as Type RS Sunlamps, carbon arc lamps, xenon arc lamps, mercury vapor lamps, tungsten halide lamps, and the like. Ultraviolet radiation may be used most efficiently if the coating comprises a photocuring rate accelerator. Curing periods of from 1 second to 15 minutes are typical.

The dry film thickness of the cured coating or adhesive, or dry thickness of the putty or adhesive, can be any desired thickness and can, for example, range from 0.1 to 10 mils, such as 0.5 to 8 or 15 to 2.0 mils. It will be appreciated that certain adhesives may be more coating-like in their viscosities and desired dry thickness, while other adhesives may be more putty-like in these qualities. One skilled in the art can determine the most appropriate means of applying the compositions of the present invention, as well as the most appropriate dry thickness based upon such things as the needs of the user and/or the particular formulation of the composition.

It is believed that, in those embodiments comprising polythiol, during the curing step both a free radical addition reaction caused by the radiation and a Michael addition reaction is occurring. Consequently, if free radical addition reaction cure is insufficient to completely cure the composition, Michael addition reaction will complete, or substantially complete, the cure. This is in addition to cure via the isocyanate/active hydrogen route or routes. The inventors do not wish to be bond by any mechanism, however.

As noted above, the present compositions may be waterborne or solventborne compositions. In certain embodiments, the compositions may be substantially solvent-free. By "solvent-free" is meant that less than 10 weight %, such as less than 5 weight % or less than 2% of the composition is solvent, with weight % based on total weight of the composition. The present compositions may be especially suitable for use as a high solids or a substantially solvent-free composition, such as 100% solids, ≧99% solids, ≧97% solids, or ≧95% solids. In certain embodiments, the theoretical volatile organic content (VOC) of the composition is less than 450 g/l, such as less than 300 g/l, or less than 250 g/l.

The compositions according to the present invention can be used as, for example, a primer, base coat or clear coat, and can also be used as an adhesive or putty. The compositions are particularly advantageous for use as a coating for car repair, since they are easily sprayable and can be applied at ambient temperatures. In certain embodiments, the coating of the present invention is a clear coat, and is used in conjunction with a pigmented base coat.

Accordingly, the present invention is further directed to a method for treating a substrate, comprising applying to at least a portion of the substrate any of the compositions described herein. Any of the substrates described above can be used. Application and cure can also be by any of the means described above.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" radiation-curable compound, "an" isocyanate, "a" polythiol, and "an" unsaturated polyester polyol oligomer, one or more of each of these and any other components can be used. As used herein, the term "polymer" refers to oligomers and both homopolymers and copolymers, and the prefix "poly" refers to two or more. Including and like terms means including but not limited to.

EXAMPLES

The following examples are intended to illustrate the invention and should not be construed as limiting the invention in any way.

Example 1

Urethane Acrylate #1

A urethane acrylate was prepared by stirring a room temperature mixture of isophorone diisocyanate, DESMODUR Z 4470 from Bayer Material Science (757.8 grams), a free radical inhibitor, IONOL (1.070 grams), dibutyltin dilaurate (2.14 grams), and triphenyl phosphite (3.92 grams) under nitrogen. Then, 2-hydroxyethyl acrylate (232.7 grams) was added drop wise over the course of 45 minutes while maintaining the reaction temperature at 75° C. The mixture was then heated to 80° C. for 60 minutes. The mixture was then cooled to 60° C. Then, 1,4-butanediol (10.0 grams) was added drop wise and then the reaction mixture was held at 60° C. for an additional 30 minutes. IR showed no isocyanate functionality remained. Finally, butyl acetate was added (150.1 grams), and the mixture briefly stirred.

Urethane Acrylate #2

A urethane acrylate was prepared by stirring a room temperature mixture of isophorone diisocyanate, DESMODUR Z 4470 from Bayer Material Science (893.0 grams), a free radical inhibitor, IONOL (1.35 grams), dibutyltin dilaurate (0.85 grams), and triphenyl phosphite (2.31 grams) under nitrogen. Then, 2-hydroxyethyl acrylate (152.3 grams) was added drop wise over the course of 20 minutes while maintaining the reaction temperature at 75° C. Then, 1,4-butanediol (6.8 grams) was added all at once, with the reaction temperature rising to 81° C. The reaction mixture was stirred for an additional 60 minutes at 75° C. Finally, butyl acetate (dried for one day over 4A molecular sieves) was added (109.6 grams), and the mixture briefly stirred.

Urethane Acrylate #3

A urethane acrylate was prepared by stirring a room temperature mixture of 1,6-hexamethylene diisocyanate, DESMODUR N 3600 from Bayer Material Science (515.3 grams), a free radical inhibitor (hydroquinone monomethyl ether (0.28 grams)), dibutyltin dilaurate (0.25 grams), and butyl acetate (140.8 grams) under nitrogen. Then, 4-hydroxybutyl acrylate (284.2 grams) was added dropwise over the course of 60 minutes while maintaining the reaction temperature at 70° C. Butyl acetate was added (59.2 grams), and the mixture was then maintained at 60-65° C. for two hours.

Urethane Acrylate #4

A mixture of n-amyl propionate (178.25 grams) and triphenyl phosphite (1.46 grams) was heated under nitrogen to reflux (157-158° C.). Then a mixture of 2-ethylhexyl acrylate (219.04 grams), hydroxyethyl methacrylate (336.98 grams), isobornyl methacrylate (98.57 grams), acrylic acid (12.64 grams), styrene (175.23 grams), tert-dodecyl mercaptan (4.19 grams), n-amyl propionate (49.63 grams) and LUPEROX DTA (Di-t-amyl peroxide, available from Arkema Inc. (29.38 grams)) was added dropwise over four hours while holding the reaction mixture at reflux temperatures (169-175° C.). An additional 11.38 grams of n-amyl propionate was added and a mixture of LUPEROX DTA (4.12 grams) and n-amyl propionate (5.37 grams) was added over 30 minutes while maintaining the reaction mixture at 175° C. An additional 11.38 grams of n-amyl propionate was added and the reaction was refluxed (173° C.) for an additional hour. The product was then cooled under a nitrogen atmosphere and submitted for analytical analyses:

GPC [in THF, polystyrene standards] (Mw 4692, Mn 1316, Mz 13367)

% Solids 75.54%

OH value 127.1

Acid value 6.84

The above acrylic resin (710.1 grams) was heated to 65° C. under nitrogen. Then urethane acrylate #3 (481.4 grams) was added drop wise over one hour while maintaining a temperature of 60-65° C. Then, butyl acetate was added (139.5 grams) and the mixture was stirred at 65° C. for an additional two hours.

Urethane Acrylate #5

A mixture of n-amyl propionate (178.25 grams) and triphenyl phosphite (1.46 grams) was heated under nitrogen to reflux (157-158° C.). Then a mixture of 2-ethylhexyl acrylate (176.92 grams), hydroxyethyl methacrylate (336.98 grams), isobornyl methacrylate (98.57 grams), acrylic acid (12.64 grams), styrene (217.35 grams), tert-dodecyl mercaptan (4.19 grams), n-amyl propionate (49.63 grams) and LUPEROX DTA (29.38 grams) was added drop wise over four hours while holding the reaction mixture at reflux temperatures (169-175° C.). An additional 11.38 grams of n-amyl propionate was added and a mixture of LUPEROX DTA (4.12 grams) and n-amyl propionate (5.37 grams) was added over 30 minutes while maintaining the reaction mixture at 175° C. An additional 11.38 grams of n-amyl propionate was added and the reaction was refluxed (173° C.) for an additional hour. The product was then cooled under a nitrogen atmosphere and submitted for analytical analyses:

GPC [in THF, polystyrene standards] (Mw 4471, Mn 1457, Mz 10017)

% Solids 77.85%

OH value 128.7

Acid value 7.54

The resulting acrylic resin (694.4 grams) was heated to 65° C. under nitrogen. Then urethane acrylate #3 (470.8 grams) was added drop wise over one hour while maintaining a temperature of 60-65° C. Then, butyl acetate was added (136.4 grams) and the mixture was stirred at 65° C. for an additional two hours.

Example 2

Itaconic Resin #1

A mixture of 1,3-propanediol (1014.53 g), hydroquinone (0.82g), p-methoxy phenol (2.00 g), butylstannoic acid (4.11 g), itaconic acid (1040.80 g), and xylene (102.8 g) was stirred under nitrogen in a 3-L flask fitted with a Dean-Start trap for azeotropic distillation. The reaction was progressively heated, collecting water from the Dean-Stark trap, until the internal temperature reached 185° C. The acid value at this point was 5.75. The product was poured into cans and analyzed.

GPC [in THF, polystyrene standards] (Mw 1145, Mn 584, Mz2002)

OH value 258.2

Itaconic Resin #2

The azeotropic distillation method used to make itaconic resin #1 was followed using a mixture of 1,3-propanediol (664.24 g), glycerol (80.90 g), ionol (0.82 g), butylstannoic acid (3.16 g), itaconic acid (750.00 g), and xylene (79.00 g). The distillation was run until an internal temperature of 186° C. was reached. The acid value was 5.30

GPC [in THF, polkystyrene standards] (Mw 998, Mn 631, Mz1619)

OH value 350.3

Example 3

Coatings 1-18 were made using the ingredients shown as follows:

|  | Coating | | | | | |
|---|---|---|---|---|---|---|
|  | #1 | #2 | #3 | #4 | #5 | #6 |
| Additive Package 1 | 34.4 g | 34.4 g | 34.4 g | 34.4 g | 34.4 g | 34.4 g |
| Urethane Acrylate #1 | 77 g | 77 g | 77 g | 89 g | 89 g | 88 g |
| Itaconic resin #1 | None | 15.8 g | 15.8 g | 18.3 g | 18.2 g | None |
| SR 355 | 26.6 g | 11.6 g | 11.6 g | 14.3 g | 4.3 g | 31.0 g |
| Amyl propionate | 10.6 g | 10.6 g | 10.6 g | 5 g | 5 g | 17.5 g |
| 4T Thiol | 12.4 | 12.4 | 12.4 | None | None | None |
| DBDTL | None | None | 0.1 g | None | 0.1 g | None |

|  | Coating | | | | | | | |
|---|---|---|---|---|---|---|---|---|
|  | #7 | #8 | #9 | #10 | #11 | #12 | #13 | #14 |
| Additive Package 1 | 34.4 g | 34.4 g | 34.4 g | 34.4 g | 34.4 g | 34.4 g | 34.4 g | 34.4 g |
| Urethane Acrylate #1 | None | None | None | None | 98 g | 98 g | 54.3 g | 54.3 g |
| Urethane Acrylate #2 | 97.4 g | 97.4 g | 55.1 g | 55.1 g | None | None | None | None |
| Itaconic resin #1 | 26.3 g | 26.3 g | 26.3 g | 26.3 g | 26.3 g | 26.3 g | 26.3 g | 26.3 g |
| DesN 3600 | None | None | 28.5 g | 28.5 g | None | None | 29.2 g | 29.2 g |
| amyl propionate | 15 g | 15 g | 29 g | 29 g | 15 g | 15 g | 29 g | 29 g |
| DBDTL | None | 0.1 g | None | 0.1 g | None | 0.1 g | None | 0.1 g |

-continued

|  | Coating | | | |
|---|---|---|---|---|
|  | #15 | #16 | #17 | #18 |
| Additive Package 2 | 57.6 g | 57.6 g | 57.6 g | 57.6 g |
| Urethane Acrylate #4 | 57.1 g | 57.1 g | None | None |
| Urethane Acrylate #5 | None | None | 56.7 g | 56.7 g |
| Itaconic resin #6 | 26.6 g | 26.6 g | 26.6 g | 26.6 g |
| Z4470 | 21.4 g | 21.4 g | 21.4 g | 21.4 g |
| DesN 3600 | 15 g | 15 g | 15 g | 15 g |
| 3T Thiol | None | 5 g | None | 5 g |
| 4T Thiol | 5 g | None | 5 g | None |

Additive Package 1

| | |
|---|---|
| 2.3 g | TINUVIN 384-2 from CIBA SPECIALTY CHEMICALS |
| 1.1 g | SANOL LS 292 from SANKYO CO |
| 0.5 g | BYK 300 from BYK Chemie |
| 5 g | ESACURE ONE from Lamberti USA |
| 1 g | IRGACURE 184 from CIBA ADDITIVES |
| 4.5 g | amyl propionate from DOW CHEMICAL CO |
| 20 g | MIBK from EASTMAN CHEMICAL |

Additive Package 1

| | |
|---|---|
| 2.3 g | TINUVIN 384-2 from CIBA SPECIALTY CHEMICALS |
| 1.1 g | SANOL LS 292 from SANKYO CO |
| 0.5 g | BYK 300 from BYK Chemie |
| 5 g | ESACURE ONE from Lamberti USA |
| 1 g | IRGACURE 184 from CIBA ADDITIVES |
| 4.5 g | amyl propionate from DOW CHEMICAL CO |
| 20 g | MIBK from EASTMAN CHEMICAL |

| | |
|---|---|
| SR 355 | Di-trimethylolpropane tetraacrylate from Sartomer |
| 4T Thiol | Pentaerythritol tetra(3-mercptopropionate) from Bruno Bock Chemische |
| 3T Thiol | Trimethylol Tri(3-mercaptopropionate) from Bruno Bock Chemische |
| DBDTL | Dibutyl Tin Dilaurate T-12 from Air Products |
| DesN 3600 | DesmodurN 3600 from Bayer MaterialScience |
| Z4470 | DesmodurZ 4470 from Bayer MaterialScience |

Procedure: Clearcoats were blend together prior to application and applied via a DeVilbiss HPLV spray gun onto substrate panels APR5174 from ACT that were previously coated with PPG ENVIROBASE basecoat.

The clear coated test panels were flashed 5 minutes and UV cured for 5 minutes using a 400 watt H&S AutoShot UVA400.

Gloss was measured at 20 degrees by a BYK Gardner micro-TRI-gloss gloss meter.

Konig was measured by a BYK Gardner pendulum Hardness apparatus.

| Coating Number | 20° Gloss | Konig Hardness 24 hour | Konig Hardness 1.5 week |
|---|---|---|---|
| #1 | 88 | 54 | 58 |
| #2 | 88 | 50 | 61 |
| #3 | 91 | 59 | 69 |
| #4 | 88 | 58 | 73 |
| #5 | 89 | 70 | 80 |
| #6 | 87 | 53 | 54 |
| #7 | 84 | 61 | 58 |
| #8 | 81 | 64 | 55 |
| #9 | 64 | 51 | 54 |
| #10 | 79 | 58 | 65 |
| #11 | 79 | 43 | 61 |
| #12 | 80 | 42 | 67 |
| #13 | 84 | 52 | 56 |
| #14 | 82 | 55 | 60 |
| #15 | 80 | 36 | 53 |

-continued

| Coating Number | 20° Gloss | Konig Hardness 24 hour | Konig Hardness 1.5 week |
|---|---|---|---|
| #16 | 88 | 38 | 43 |
| #17 | 90 | 33 | 43 |
| #18 | 89 | 33 | 43 |

As can be seen in the above table, the coatings of the present invention have relatively high 20° Gloss. The higher the Konig Hardness number, the harder the through cure of the coating. The increase over time shows the post cure that can occur with the isocyanate reaction. These values are acceptable for automotive refinish.

Whereas particular embodiments of this invention have been described above for purposes of illustration, it will be evident to those skilled in the art that numerous variations of the details of the present invention may be made without departing from the invention as defined in the appended claims.

The invention claimed is:

1. A composition comprising:
    a) an unsaturated polyester polyol oligomer;
    b) isocyanate; and
    c) a polythiol comprising esters of thiol-containing acids.

2. The composition of claim 1, wherein the unsaturated polyester polyol oligomer is the reaction product of a polyacid/anhydride and a polyol, wherein the polyacid and/or polyol are unsaturated.

3. The composition of claim 2, wherein the acid/anhydride comprises itaconic acid/anhydride.

4. The composition of claim 2, wherein the polyol comprises 1,3-propane diol.

5. The composition of claim 2, wherein the acid/anhydride comprises itaconic acid/anhydride and the polyol comprises 1,3-propane diol.

6. The composition of claim 1, further comprising a radiation-curable compound.

7. The composition of claim 6, wherein the radiation-curable compound comprises a polyurethane having (meth)acrylate radiation-curable groups.

8. The composition of claim 7, wherein the polyurethane having (meth)acrylate radiation-curable groups further comprises hydroxy functionality.

9. The composition of claim 1, wherein the polythiol comprises trimethylol tri(3-mercaptopropionate).

10. A clear coat obtained from the composition of claim 1.

11. The composition of claim 1, wherein the composition is a three-component composition and the unsaturated polyester polyol oligomer is in a first component, the isocyanate is in a second component, and the polythiol is in a third component.

12. The composition of claim 11, wherein the first component comprising the unsaturated polyester polyol oligomer further comprises a free radical initiator.

13. A method for treating a substrate, comprising applying to at least a portion of the substrate the composition of claim 1.

14. A substrate treated, at least in part, with the clear coat of claim 12.

15. A substrate coated at least in part with a pigmented base coat over which is deposited, at least in part, the clear coat of claim 10.

16. A composition comprising:
   a) a first component comprising:
      i) a hydroxyl-containing reaction product of a polyacid/anhydride and a polyol; and
      ii) a radiation-curable compound;
   b) a second component comprising isocyanate; and
   c) a third component comprising polythiol comprising esters of thiol containing acids.

17. The composition of claim 16, wherein the polyacid/anhydride comprises itaconic acid/anhydride and the polyol comprises 1,3-propane diol.

18. The composition of claim 16, wherein the radiation-curable compound comprises a polyurethane having (meth)acrylate radiation-curable groups.

19. A composition comprising:
   a) an unsaturated polyester polyol oligomer;
   b) isocyanate; and
   c) a polythiol, wherein the polythiol comprises trimethylol tri(3-mercaptopropionate).

\* \* \* \* \*